Patented Mar. 12, 1929.

1,705,273

UNITED STATES PATENT OFFICE.

MERWYN C. TEAGUE, OF JACKSON HEIGHTS, NEW YORK, ASSIGNOR TO THE NAUGATUCK CHEMICAL COMPANY, OF NAUGATUCK, CONNECTICUT, A CORPORATION OF CONNECTICUT.

PROCESS OF MAKING RUBBER SURFACING ON A RIGID BASE AND PRODUCT.

No Drawing.   Application filed April 22, 1925.   Serial No. 25,122.

This invention relates to a process for making a rubber surfacing on a rigid base and to the product thereof, more particularly to a process which may be applied in the making of a surfacing such as a flooring or pavement either in situ or in sections to be later placed in the desired position.

There is a great need for a rubber flooring or pavement which can be laid on a rigid base either in situ or in the form of previously prepared sections. For many years attempts have been made to make various types of rubber pavement and flooring but the processes are expensive and the majority of them have been found unsatisfactory, particularly by reason of the difficulty experienced in securing a proper bond between the rubber surfacing material and the rigid base such as concrete. Various methods of keying the rubber surfacing to the base have been tried but they have been found either too expensive, or defective, or both. The majority of the rubber pavements or floorings heretofore proposed involve the use of prepared blocks in which the rubber portion is formed by molding, and the blocks are then laid in various manners similar to other paving blocks and tiles, although some rubber pavements have been devised which can be formed in situ.

An object of my invention is to provide a cheap and easily laid rubber flooring or pavement on a rigid base, which can be either laid in situ or in the form of previously prepared sections. Another object is to provide a rubber flooring on a rigid base in which the union between the rubber and base is such that they will not separate in use. Another object is to provide a rubber flooring on a rigid base which can be laid in unvulcanized form and then cured in situ, or which, if desired, can be laid in plastic vulcanized form. Another object is to provide a rigid flooring which can be quickly laid, is of good appearance, good wearing quality, and which has an easy tread.

Without intention to limit the invention beyond what may be required by the prior art, it consists briefly in forming a rigid base from a suitable material while in plastic condition, providing a keying surface on such base while still in plastic condition as by partially imbedding therein ground or otherwise comminuted binding material or by forming depressions in the base, preferably undercut, allowing the base material to completely set, then uniting to the treated surface a surfacing of plastic rubber composition in the cold as by the use of a polar compound, and finally curing when desired. It also includes superposing a rubber composition on a base while both are in plastic form and keying them together while in this condition.

For a detailed disclosure of the nature and objects of the invention reference is had to the accompanying specification and claims.

In carrying out the invention if, for example, it is desired to form the flooring or pavement in situ, a base may be spread of a suitable rigid material while still in plastic form, for instance, concrete, and over the surface of the wet concrete is distributed ground or otherwise comminuted binding material, preferably material having rough edges or surfaces such as ground slate or other stone, cork, etc. The concrete is then allowed to set or fully harden before applying to it the rubber surfacing. The rubber surfacing is preferably in the form of a compounded water dispersion of rubber which may contain a polar compound and any suitable fillers and pigments. The term "polar" is applied to compounds the molecules of which exhibit orientation. Polar compounds in general are chemical compounds having a high molecular weight and the individual molecules having relatively great length compared with their cross section. The water dispersion of rubber used may be rubber latex or an artificial dispersion, and if the compound is to be vulcanized suitable vulcanizing ingredients may be included such as those which will cold cure or cure at temperatures below the normal hot vulcanization temperatures, that is, below about 240° F. The rubber composition may be poured, troweled, or otherwise applied, depending on the consistency of the mix used and other conditions. The ground slate, etc. forms interconnecting elements extending up into the plastic surfacing and the surfacing compound forms interconnecting plastic elements extending into the base. In certain cases if a vulcanized rubber surface is desired the water dispersion used may be in the form of vulcanized rubber latex. The polar compound when added to the mix aids greatly in forming a strong and lasting union between the concrete and the slate or other ground material and the rubber. The reason that a good union is not ordinarily formed between a material such as concrete and rubber is that the rubber does not "wet and to a certain extent penetrate the concrete" so to speak. The chemical compounds known as "polar compounds" have the property of "wetting" or uniting two materials, one of which as before stated does not readily wet or unite with the other. Taking for example a concrete, the surface of which has not been finished with neat cement, a rubber dispersion containing a polar compound may be spread thereon or otherwise placed in contact therewith and allowed to dry. It will be found that the rubber coating thus laid upon the concrete will have a much higher degree of adhesion to the concrete than an ordinary rubber dispersion which does not contain a polar compound or wetting agent. It is believed that the combination of the wetting agents and rubber latex or other aqueous suspension of rubber when applied to the water repellant materials efficiently carries the rubber in and on to the materials because of an orientation of the molecules of the wetting agent and of the greater affinity of the hydrocarbon portion of the molecules for the water repellant materials. There are a large number of such compounds which vary in their characteristics as described in my copending applications Serial No. 20,010, filed April 1, 1925, and Serial No. 737,597, filed September 13, 1924, among which may be mentioned sulphonated castor oil, ortho toluidine, sodium sulphanilite, thiourea, sodium salicylate, ammonium linolenate or isolinolenate, and saponin. For the particular invention herein disclosed the use of sulphonated castor oil is preferred, but other sulphonated oils or compounds possessing the desired characteristics may be employed, or combinations of them. The rubber compound used in flooring according to the present invention should possess a short stretch with great toughness and wear resistance, so that the compound will be thoroughly and firmly united to the concrete base and ground binding material.

As a modification of the above procedure the concrete or other base material while still somewhat plastic or incompletely set may be scored or otherwise indented with grooves, recesses, etc., the grooves preferably being undercut and the recesses formed at an angle. After setting of the base the rubber surfacing may be applied in any of the ways above described.

As a further modification a concrete or other suitable base may be laid in plastic form, and, while still somewhat plastic or incompletely set, covered with the desired rubber surfacing in plastic form. In order to thoroughly key together the two materials a spiked roller having spikes of sufficient length to penetrate the base may then be passed over the surface. In this manner the plastic rubber surfacing will be forced or otherwise carried down into the base material to form an excellent bond between the materials. Instead of a spiked roller one having blades may be used, or any other means for inserting the plastic surfacing in the base at desired intervals. It will be seen that in each of the last two examples interconnecting elements are formed extending from one material into the other.

As an example of a rubber compound suitable for the surfacing the following is given:

100 parts rubber as latex
100 parts ground flint
50 parts Gilders whiting
75 parts lithopone
25 parts zinc oxide
15 parts Montan wax
5 parts casein (as ammonium caseinate)
5 parts Karaya gum
2 parts sulphur
1 part zinc dimethylaminodithiocarbamate
20 parts sulphonated castor oil.

Another suitable compound is as follows:

100 parts rubber as latex
100 parts ground silica
50 parts Gilders whiting
100 parts lithopone
5 parts zinc oxide
2 parts sulphur
1 part zinc dimethylaminodithiocarbamate
10 parts sulfonated castor oil
2 parts oil blue.

The first of the above is a white compound and the second a blue one, but by the use of suitable pigments any colored compound can be obtained. The flint can be replaced by burnt clay or other non-absorptive fillers and can be varied in amount. Various compounding ingredients such as Gilders whiting, lithopone, zinc oxide, red oxide, Mapico yellow, or other pigments, can be used both to obtain the desired color and to alter the properties and cost of the compound. Other accelerators may be used instead of the zinc dimethylaminodithiocarbamate. The sulphonated castor oil can also be varied in amount or substituted by some other polar compound as above stated. The particular polar compound used will depend somewhat on the ground binding material which is used for surfacing the concrete base. While in the above examples the polar compound or contact agent has been mixed with the rubber compound, a somewhat similar effect can be obtained by omitting the polar compound from the rubber mix, and instead first spraying or otherwise coating the roughened surface of the concrete with a solution of the polar compound and then applying the rubber mix. Since this involves two operations, however, instead of one, it is preferred to include the polar compound in the rubber mix. While, of course, a sufficient thickness of the rubber compound may be applied to completely cover the ground binding material imbedded in the concrete, the rubber mix may also be applied in a relatively thin layer so that the granules of the binding material will project, and after vulcanization (which may or may not be necessary) the surface can be buffed to produce a smooth surface having a varying and pleasing color effect where the granules of the binder reach the surface. Various color effects can be obtained by using granules of different binding material or mixes of different materials, and the colors of the rubber mix can also be varied. If a rubber mix containing vulcanizing ingredients has been used the vulcanization of the rubber compound may be accomplished or hastened by the use of a heated roller, which also produces a smooth effect and hastens the drying.

As an example of a more plastic compound especially suitable for trowelling, the following is given.

100 parts rubber as latex containing 60% solids
300 parts ground flint
25 parts litharge
5 parts lead thiosulphate
3 parts sulphur
0.5 part zinc dimethylaminodithiocarbamate
25 parts medium spindle oil (as emulsion).

This compound may be laid on a scored or undercut concrete base, a thickness of about one-half inch of the compound being suitable, and such a compound after drying and curing forms a surfacing which is quite resilient and soft to the tread. The concentration of solids in the latex may be varied over a considerable range and instead of natural latex an artificial one may be employed, and if desired a vulcanized latex can also be used. The ground flint can be varied in proportion and in mesh, and may be replaced partially or completely by other inert fillers or coarsely ground materials, such as ground slate of varying colors, ground porcelain or glass, coarsely ground bits of cork, etc. The litharge and lead thiosulphate are employed in the above compound to facilitate curing and thickening, and they may be varied in amount or entirely omitted. The sulphur can likewise be used in varying amounts. The zinc dimethylaminodithiocarbamate is a high power accelerator of vulcanization and can be varied in amount or replaced by other accelerators such as tetramethylthiuramdisulphide or by a combination of dibenzyl amine with either oxy normal butyl thiocarbonic acid disulphide or zinc butyl xanthogenate. The spindle oil is used as a softener and can be varied in amount or eliminated. If desired a polar compound can also be added to the last-named mix, a suitable proportion being about 10 parts.

In the above examples instead of applying the relatively plastic compounds mentioned directly to the scored or otherwise roughened concrete base the base may be first covered with a very thin rubber solution which will further insure the filling of all crevices and pores and thereby give a better adhesion, this coat being then followed by a layer of the thicker and more plastic surfacing compound. In still another alternative a rubber compound containing an appreciable quantity of coarse filler and Portland cement may be first applied to the base and then followed by one of the compounds previously mentioned. This intermediate layer will have some of the properties of both the concrete base and the top surfacing compound, so that the change in properties from the rigid concrete base to the relatively elastic top surfacing will be more gradual. In some cases it may be desirable to apply a finishing coat of rubber hydrochloride in solution or in any other suitable manner, which imparts a gloss to the surface and removes the tacky or rubber feel.

While in the examples previously given the invention has been described as applied to making a flooring or pavement in situ, it is evident that it is also applicable where the rigid base material is preformed in blocks to be later laid in the usual manner, and in such case by the use of blocks having a rubber surfacing of different colors a tiled effect may be obtained. While the invention has also been described with the use of a concrete base it is evident that any other suitable rigid base material having the desired characteristics may be used, and other ways of producing a good binding surface on the base may be employed. In forming the surfacing compounds coagulated rubber in organic solvents may be used, but it is preferred to use a water dispersion of rubber.

As before pointed out flooring of the type produced by my invention has previously been impracticable owing to the fact that proper adhesion could not be obtained between the rigid base and the rubber surface, but by the use of my invention a firm and permanent union between the base and surfacing has been obtained, this being due to the ground or comminuted binding material which is rigidly imbedded in the base and offers a large and irregular surface for union with the rubber compound, or to the depressions formed in the base material in the manner previously described. The bond is still further strengthened by the use of the polar compound or contact agent which in some cases penetrates to some extent the binding material and which furnishes a strong bond between the rubber compound and all surfaces with which it contacts.

While specific embodiments of the invention has been described it is obvious that with the disclosure herein numerous modifications will suggest themselves to those skilled in the art, and it is not desired to limit the invention otherwise than as set forth in the appended claims.

Having thus described my invention what I claim and desire to protect by Letters Patent is:—

1. The process of making a composite rubber surfacing which comprises forming a rigid base from plastic material, partly imbedding in the material while still plastic a comminuted binding material, and uniting a rubber containing material to said base and binding material by a polar compound.

2. The process of making a composite rubber surfacing which comprises forming a rigid base from plastic material, partly imbedding in the material while still plastic a comminuted binding material of irregular shape, and distributing thereon a plastic rubber mix containing a polar compound.

3. The process of making a composite rubber surfacing which comprises forming a rigid base from plastic material, partly imbedding in the material while still plastic a coarsely ground binding material, and spreading thereon a compounded water dispersion of rubber containing a polar compound.

4. The process of making a composite rubber surfacing which comprises forming a concrete base, partly imbedding in the concrete before setting a comminuted binding material of irregular shape, and spreading thereon compounded rubber latex containing a polar compound.

5. The process of making a composite rubber surfacing which comprises forming a rigid base from plastic material, partly imbedding therein while still plastic comminuted binding material of irregular shape, and uniting a compounded rubber latex to the base and binding material by a polar compound.

6. The process of making a composite rubber surfacing which comprises forming a base from a rigid material while in plastic form, partly imbedding therein a comminuted binding material, hardening the base, spreading thereon a compounded water dispersion of rubber containing a polar compound, and curing the rubber below the normal hot vulcanization temperature.

7. The process of making a composite rubber surfacing which comprises forming a base in situ from plastic material capable of setting to a rigid form, partly imbedding therein a comminuted binding material, hardening the base, and spreading thereon a compounded rubber latex containing a polar compound.

8. The process of making a composite rubber surfacing which comprises providing a rigid base of plastic material with a roughened binding surface while still in plastic form, hardening the base, and uniting a plastic rubber compound to said surface by a polar compound.

9. The process of making a composite rubber surfacing which comprises providing a rigid base of plastic material with a roughened binding surface while still in plastic form, hardening the base, applying to said surface a compounded water dispersion of rubber containing a polar compound, and curing.

10. The process of making a composite rubber surfacing which comprises providing a rigid base of plastic material with a roughened binding surface while still in plastic form, hardening the base, applying to said surface a compounded rubber latex containing a polar compound, and curing.

11. The process of making a composite rubber surfacing which comprises forming a rigid base of plastic material, partly imbedding therein while still plastic a comminuted binding material, hardening the base, and applying thereto a water dispersion of rubber containing a sulphonated oil.

12. The process of making a composite rubber surfacing which comprises forming a rigid base of plastic material, partly imbedding therein while still plastic a comminuted binding material, hardening the base, applying thereto a compounded rubber latex containing a sulphonated oil, and curing.

13. The process of making a composite rubber surfacing which comprises providing a rigid base of plastic material with a roughened binding surface while still in plastic form, hardening the base, and uniting a compounded rubber latex to said surface by a sulphonated oil.

14. The process of making a composite rubber surfacing which comprises forming a rigid base of plastic material, partly imbedding therein while still plastic a comminuted binding material, hardening the base, and applying thereto a compounded rubber latex containing sulphonated castor oil.

15. The process of making a composite rubber surfacing which comprises forming a base of a plastic material capable of setting to a rigid form, before setting partly imbedding therein a comminuted binding material, after setting uniting a water dispersion of rubber to the base by a polar compound, and curing.

16. The process of making a composite rubber surfacing which comprises forming a base of a plastic material capable of setting to a rigid form, before setting partly imbedding therein a comminuted binding material, after setting uniting a water dispersion of rubber to the base by a sulphonted oil, and curing.

17. The process of making a composite rubber surfacing which comprises forming a base of concrete, before setting of the concrete partly imbedding therein a comminuted binding material, and after setting applying thereto a compounded rubber latex containing sulphonated castor oil.

18. The process of making a composite rubber surfacing which comprises forming in situ a base of concrete, before setting of the concrete partly imbedding therein a comminuted binding material, after setting applying thereto a compounded rubber latex containing sulphonated castor oil, and curing.

19. The process of making in situ a composite rubber pavement or flooring which comprises spreading a plastic base settable to a rigid form and a plastic rubber surfacing compound, dispersing interconnecting elements extending from one into the other, and removing fluid from the materials.

20. The process of making in situ a composite rubber pavement or flooring which comprises providing a plastic base settable to a rigid form and a plastic surfacing comprising a water dispersion of rubber, dispersing interconnecting elements extending from one into the other, and drying the materials.

21. The process of making a composite rubber pavement or flooring which comprises laying in situ a plastic base settable to a rigid form, imbedding in said base while plastic a plurality of interconnecting elements, disposing on the base a plastic rubber compound of a depth approximately covering said interconnecting elements, and buffing the surface after setting of the material.

22. The process of making a composite rubber pavement or flooring which comprises laying in situ a plastic base settable to a rigid form, imbedding in said base while plastic a plurality of interconnecting elements, disposing on said base a plastic surfacing comprising a water dispersion of rubber to a depth approximately covering said interconnecting elements, buffing the surface after setting of the material, and applying a finishing coat of a rubber hydrohalide.

Signed at New York, county of New York, State of New York, this 18th day of April, 1925.

MERWYN C. TEAGUE.